US009101838B2

(12) United States Patent
Dascher

(10) Patent No.: US 9,101,838 B2
(45) Date of Patent: Aug. 11, 2015

(54) DUAL PIVOT GAME CONTROLLER

(71) Applicant: David J. Dascher, Colorado Springs, CO (US)

(72) Inventor: David J. Dascher, Colorado Springs, CO (US)

(*) Notice: Subject to any disclaimer, the term of this patent is extended or adjusted under 35 U.S.C. 154(b) by 196 days.

(21) Appl. No.: 13/951,581

(22) Filed: Jul. 26, 2013

(65) Prior Publication Data
US 2015/0031456 A1  Jan. 29, 2015

(51) Int. Cl.
*A63F 13/24* (2014.01)
*A63F 13/285* (2014.01)

(52) U.S. Cl.
CPC ............... *A63F 13/24* (2014.09); *A63F 13/285* (2014.09)

(58) Field of Classification Search
CPC ........ A63F 13/06; A63F 13/24; A63F 13/285
USPC .................................. 463/37, 38; 273/148 B
See application file for complete search history.

(56) References Cited

U.S. PATENT DOCUMENTS

| | | | |
|---|---|---|---|
| 5,261,291 A | 11/1993 | Schoch | |
| 5,829,745 A | 11/1998 | Houle | |
| 6,296,571 B1 | 10/2001 | McVicar | |
| 6,544,124 B2 | 4/2003 | Ireland | |
| 6,572,108 B1 * | 6/2003 | Bristow | 273/148 B |
| 6,581,704 B2 | 6/2003 | Law | |
| 6,659,870 B2 | 12/2003 | Sobota | |
| RE42,496 E | 6/2011 | Golliher | |
| 8,088,005 B2 | 1/2012 | Burgel | |
| 8,574,050 B2 * | 11/2013 | Osnato et al. | 463/8 |
| 8,760,397 B2 * | 6/2014 | Robbins et al. | 345/156 |
| 8,833,568 B2 * | 9/2014 | Tsunezumi et al. | 211/26.1 |
| 8,840,473 B2 * | 9/2014 | Chen et al. | 463/37 |
| 8,882,596 B2 * | 11/2014 | Shimamura et al. | 463/37 |
| 2002/0169023 A1 | 11/2002 | Tanaka | |
| 2003/0139213 A1 | 7/2003 | Sobota | |
| 2004/0217943 A1 * | 11/2004 | Kim | 345/161 |
| 2004/0259638 A1 * | 12/2004 | Kramer et al. | 463/36 |
| 2005/0215321 A1 | 9/2005 | Hussaini | |
| 2005/0277470 A1 * | 12/2005 | Watanachote | 463/37 |
| 2008/0146336 A1 | 6/2008 | Feldman | |
| 2008/0280681 A1 * | 11/2008 | Kidakarn | 463/37 |
| 2010/0261526 A1 | 10/2010 | Anderson | |
| 2011/0256930 A1 | 10/2011 | Jaouen | |

FOREIGN PATENT DOCUMENTS

WO  WO-2009143208 A2  11/2009
WO  WO-2009143568 A1  12/2009

* cited by examiner

*Primary Examiner* — Jason Skaarup
(74) *Attorney, Agent, or Firm* — Leyendecker & Lemire

(57) ABSTRACT

A dual pivot game controller including two rotating assemblies, one for each of a user's two hands, is described. Each of the two rotating assemblies is coupled to a base by a pivoting coupling, and each pivoting coupling includes an axis of rotation about which its respective rotating assembly rotates. Accordingly, each rotating assembly and pivoting coupling share an axes of rotation, and each rotating assembly is thus configured to rotate relative to the base to which it is coupled. The axes of rotation usually reside in a common plane and are substantially non-parallel, such that they intersect at an axes intersection angle. An axes intersection angle of about 52° is typical. The two rotating assemblies are usually operationally coupled to each other such that they rotate in tandem during use.

18 Claims, 9 Drawing Sheets

DUAL PIVOT GAME CONTROLLER

BACKGROUND

Game controllers are typically employed for user control of video games and computer simulations of driving, flying, weapons operation, and the like (referred to collectively as video games). The video games are typically operated on a gaming device configured to receive signals or instructions from the game controller. Typical game controllers include joysticks, dual thumb-driven, mini-joysticks, table top steering wheels, and un-mounted steering wheels, among others. All of the currently available game controllers suffer drawbacks, despite some advantages offered by various designs.

For instance, table top steering wheel controllers perform well for car driving and racing games or simulations, providing realistic performance and tactile feedback. However, such devices must typically be mounted on a stable, flat, horizontal surface in order to perform well. In the absence of mounting on a table top or similar surface, the devices typically perform poorly because the entire device, including a base designed to remain stationary while the steering wheel itself rotates relative to the base, tends to move around as a user turns the steering wheel. Table top steering wheel controllers are thus poorly adapted for use where a user sits partially reclined on a couch, or is otherwise unwilling or unable to use the device mounted on a horizontal surface.

Conversely, unmounted steering wheel controllers typically perform relatively poorly in all circumstances because they can be moved in any direction in addition to being rotated, and they provide little or no meaningful tactile feedback. On the plus side, their performance is typically no worse where a user is slouched on a couch.

Dual thumb-driven mini joysticks also do not require mounting on a flat surface, and are thus adapted to use in a variety of postures. However, such devices are controlled mainly by thumb movement, and typically require a relatively large range of thumb motion. Such requirement, combined with limits of thumb dexterity typical of most users, makes dual thumb-driven mini joysticks relatively poor performers.

Finally, regular joysticks can provide good tactile feedback and are adapted to fine motor control, resulting in high performing controllers. However, the joysticks suffer the same drawback as table top steering wheel controllers, in that the joysticks typically need to be mounted on a stable, flat, horizontal surface for good performance.

Given the limitations of prior art game controllers, a game control device that is easy to operate and provides high level performance without requiring table top mounting is needed. Such a device that provides ample tactile feedback is also desirable.

Figure 1:
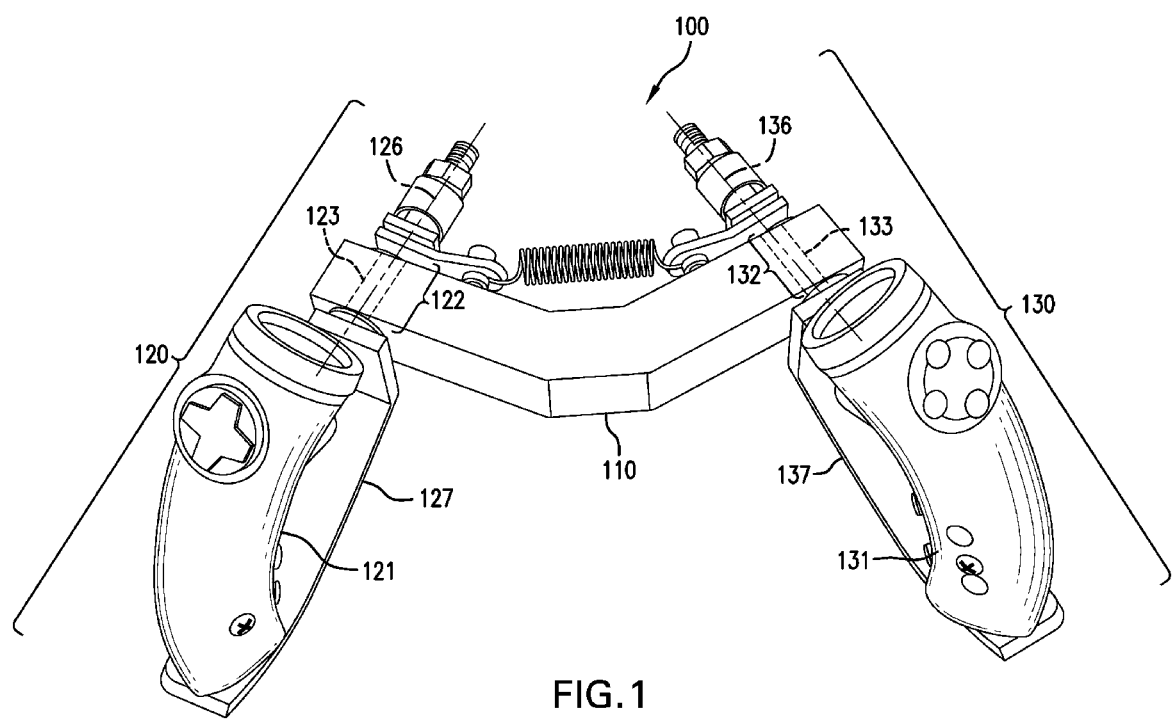
FIG. 1 is a front side, perspective view of a dual pivot game controller according to an embodiment of the present invention.
Figure 2:
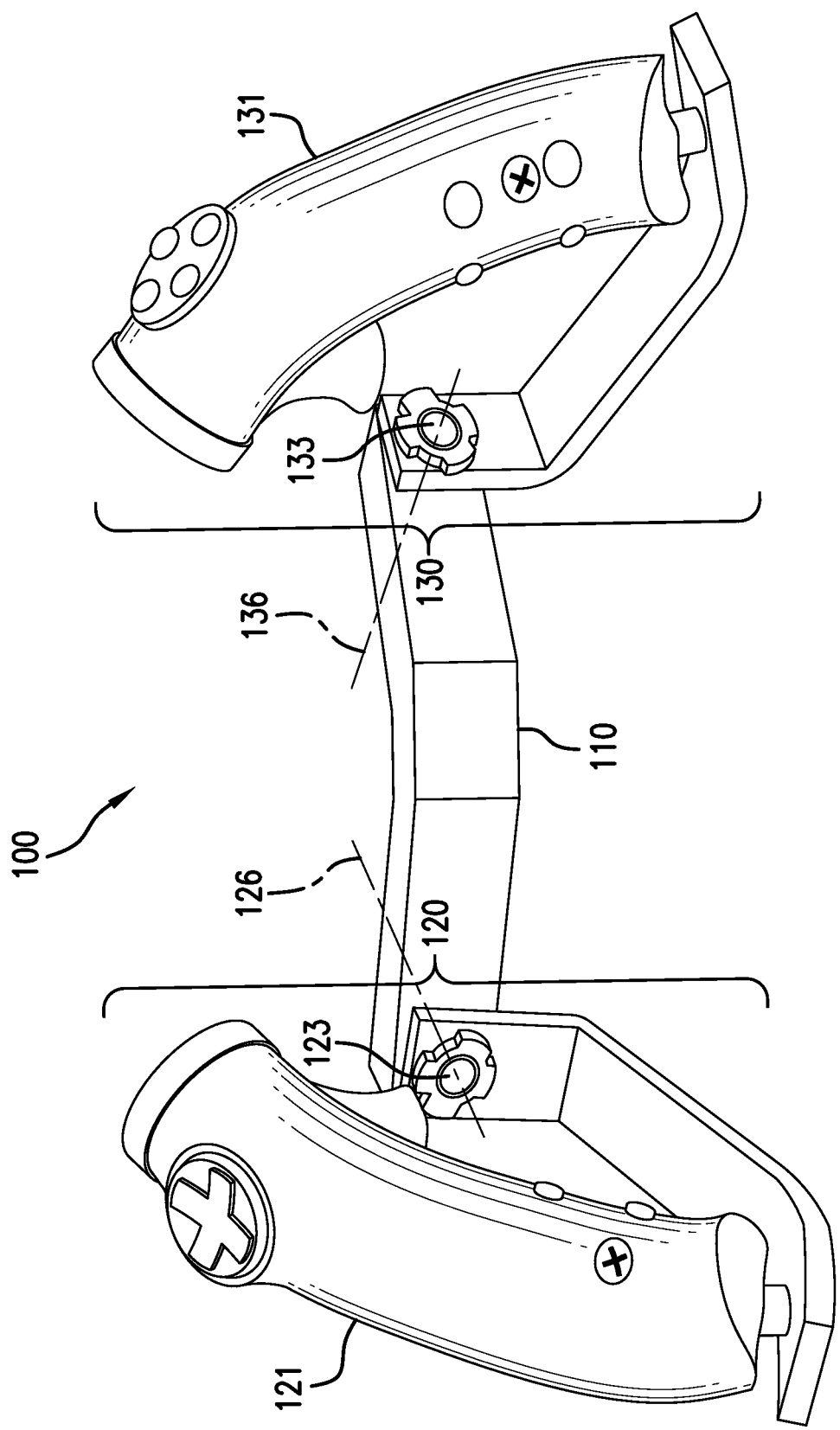
FIG. 2 is a front, top side, perspective view of a dual pivot game controller according to an embodiment of the present invention.

Front side refers to a side of the game controller that faces toward a user in typical operation of the controller. Back side refers to a side that faces away from the user in typical operation.

DETAILED DESCRIPTION

Embodiments of a dual pivot game controller according to the present invention include two rotating assemblies, one for each of a user's two hands. Each of the two rotating assemblies is coupled to a base by a pivoting coupling, and each pivoting coupling includes an axis of rotation about which its respective rotating assembly rotates. Accordingly, each rotating assembly and pivoting coupling share an axis of rotation, and each rotating assembly is thus configured to rotate relative to the base to which it is coupled. The axes of rotation usually reside in a common plane and are not parallel, such that they intersect at an axes intersection angle. An axes intersection angle of about 52° is typical.

The two rotating assemblies are typically operationally coupled to each other such that they rotate in tandem. Rotating in tandem means that if a first rotating assembly rotates in one direction or the other about a first axis of rotation by a certain amount (referred to as a rotation angle), a second rotating assembly operationally coupled to the first rotating assembly rotates by a substantially identical rotation angle. The units of rotation angle are typically degrees (°). The base typically stays relatively stationary as the rotation assemblies rotate about their axes.

Each of the two rotating assemblies includes a handle section adapted to be comfortably grasped by a user's hand. Each handle section is typically intersected by the axis of rotation of its respective rotating assembly. Where a user holds the dual pivot game controller in a normal operating position, with a handle section residing in each of the user's two hands and the user's elbows hanging loosely at the user's sides, each axis of rotation is approximately in alignment with the user's forearms. This alignment is unprecedented in the prior art and is a function of a distance between the handle sections (referred to as handle spread) and the axes intersection angle. The alignment enables supremely comfortable and nimble operation of the controller. A typical handle spread, where the axes intersection angle is about 52°, is approximately 9.25 inches. Handle spread is the distance between points where each axis of rotation intersects its respective handle section.

The rotating assemblies typically include a biasing mechanism that biases the rotating assemblies to a neutral orientation. The biasing mechanism typically exerts an opposing force that is generally progressive, meaning the opposing force increases as the absolute value of the rotation angle (relative to a neutral orientation) of a rotating assembly increases, and decreases as absolute value of the rotation angle (relative to a neutral orientation) decreases.

Dual pivot game controllers according to the present invention typically include a battery for power, but variations can plug into a dedicated power supply or into a gaming device for power. Gaming devices include, but are not limited to, video game consoles, arcade games, computers, and the like, which are adapted to run video games in which a user controls various game functions.

TERMINOLOGY

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive; rather the term is inclusive, meaning either or both.

References in the specification to "one embodiment", "an embodiment", "another embodiment", "a preferred embodiment", "an alternative embodiment", "one variation", "a variation" and similar phrases mean that a particular feature, structure, or characteristic described in connection with the embodiment or variation, is included in at least an embodiment or variation of the invention. The phrase "in one embodiment", "in one variation" or similar phrases, as used in various places in the specification, are not necessarily meant to refer to the same embodiment or the same variation.

The term "couple" or "coupled" as used in this specification and appended claims refers to an indirect or direct physical connection between the identified elements, components, or objects. Often the manner of the coupling will be related specifically to the manner in which the two coupled elements interact.

The term "directly coupled" or "coupled directly," as used in this specification and appended claims, refers to a physical connection between identified elements, components, or objects, in which no other element, component, or object resides between those identified as being directly coupled.

The term "approximately," as used in this specification and appended claims, refers to plus or minus 10% of the value given.

The term "about," as used in this specification and appended claims, refers to plus or minus 20% of the value given. An exception to this quantitative definition occurs where the "about" is used to describe rotation about an axes.

The terms "generally" and "substantially," as used in this specification and appended claims, mean mostly, or for the most part.

The terms "removable", "removably coupled", "removably installed," "readily removable", "readily detachable", "detachably coupled", "separable," "separably coupled," and similar terms, as used in this specification and appended claims, refer to structures that can be uncoupled, detached, uninstalled, or removed from an adjoining structure with relative ease (i.e., non-destructively, and without a complicated or time-consuming process), and that can also be readily reinstalled, reattached, or coupled to the previously adjoining structure.

Directional or relational terms such as "top," "bottom," "front," "back," "above," "beneath," and "below," as used in this specification and appended claims, refer to relative positions of identified elements, components, or objects, where the components or objects are oriented in an upright position as normally installed or used.

A First Embodiment Dual Pivot Game Controller

A first embodiment dual pivot game controller 100 is illustrated in FIGS. 1-6. The first embodiment dual pivot game controller 100 comprises a base 110 to which are pivotably coupled a first rotating assembly 120 and a second rotating assembly 130. The first rotating assembly 120 includes a first pivoting connection 122 by which the assembly 120 is pivotably coupled to the base 110. The first pivoting connection 122 comprises a first axle 123 supported by bearings (not visible) as the first axle 123 passes through the base 110. In typical operation, the first rotating assembly 120 rotates about the first axle 123. A first axis of rotation 126 for the first rotating assembly 120 thus passes though the first axle 123. The first rotating assembly 120 further comprises a first handle section 121 configured to be grasped by a user's left hand 170 (see FIG. 6A) in order to facilitate handling and rotation of the first rotating assembly 120 by the user.

The first rotating assembly 120 further comprises a first joining member 127 that couples the first handle section 121 to the first pivoting connection 122. The first joining member 127 is coupled directly to an end of the handle section 121, and extends about 3.25 inches from the first handle section 121 to the first pivoting connection 122. The first joining member thus sets that first handle section apart from the first pivoting connection 122 and the base 110, such that the first pivoting 122 connection and the base 110 do not interfere with a user's grasp of the first handle section 121.

The second rotating assembly 130 is substantially a mirror image of the first rotating assembly 120, and thus comprises analogous constituent structures: a second pivoting connection 132 comprising a second axle 133 supported by bearings as it passes through the base 110; a second axis of rotation 136 about which the second rotating assembly 130 rotates, a second handle section 131 configured to be grasped by the user's right hand 180 in order to facilitate handling and rotation of the second rotating assembly by the user, and a second joining member 137 that couples the second handle section 131 to the second pivoting connection 132.

The first and second rotating assemblies 120,130 are rotatably linked such that the assemblies rotate in tandem, i.e. direction and magnitude of rotation of the first rotating assembly 120 about the first axis of rotation 126 causes a substantially identical rotation of the second rotating assembly 130 about the second axis of rotation 136, and vice versa. Thus where a user rotates the second rotating assembly by a second rotation angle 168 of +45° about the second axis of rotation and +45° relative to the base (45° in a clockwise direction), the first rotating assembly rotates by a first rotation angle 158 of +45° (see FIG. 5A). Similarly, where the user rotates the second rotating assembly by a second rotation angle 168 of −45° about the second axis of rotation and −45° relative to the base (45° in a counterclockwise direction), the first rotating assembly also rotates by a rotation angle of −45° (see FIG. 5B).

Figure 6A:
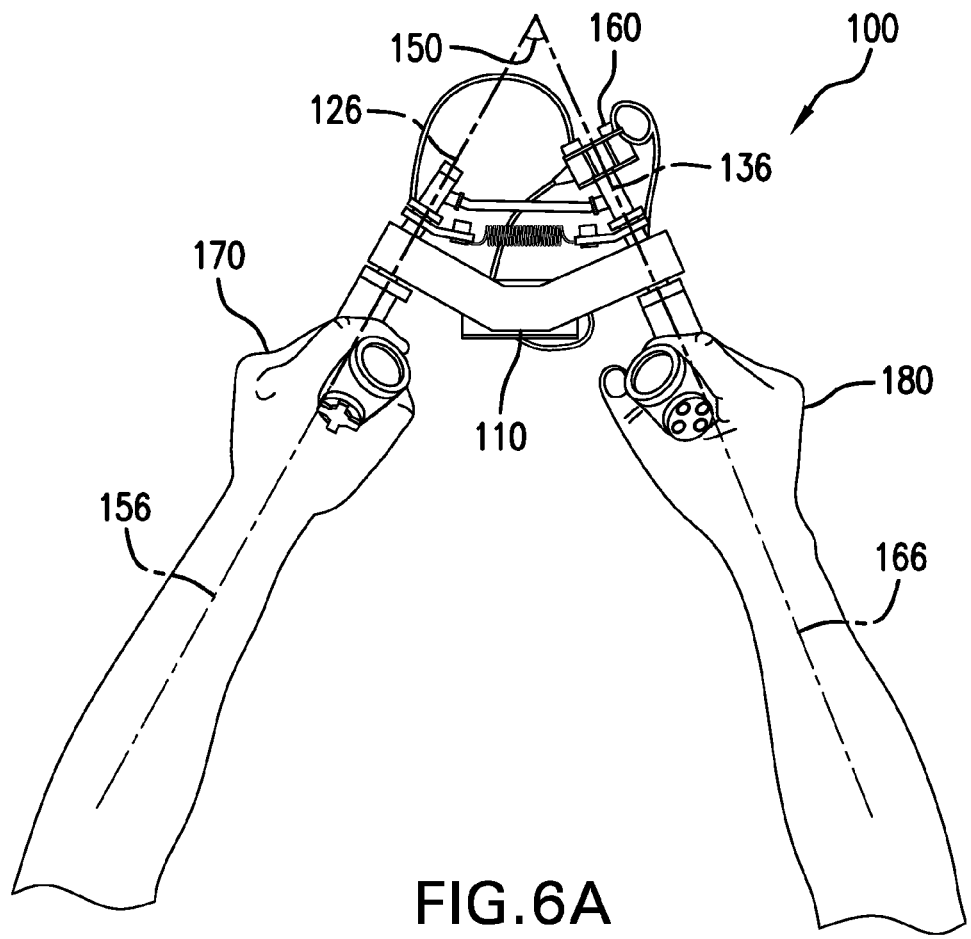
FIG. 6A is a top side, plan view of a dual pivot game controller according to an embodiment of the present invention.

As best seen in FIG. 6A, the first and second axes of rotation 126,136 (and hence the first and second axles 123, 133) are substantially non-parallel, meaning they are at least 11° from parallel. The first and second axes furthermore reside in a common plane and intersect at an axes intersection angle 150 of about 52°. Embodiments of axes intersection angles are preferably between 22° and 82°, more preferably between 37° and 67°, and most preferably between 44° and 60°. In typical use, the first and second axes converge as they project forwardly (from the user's perspective) away from the user, and diverge as they project toward the user.

Figure 6B:
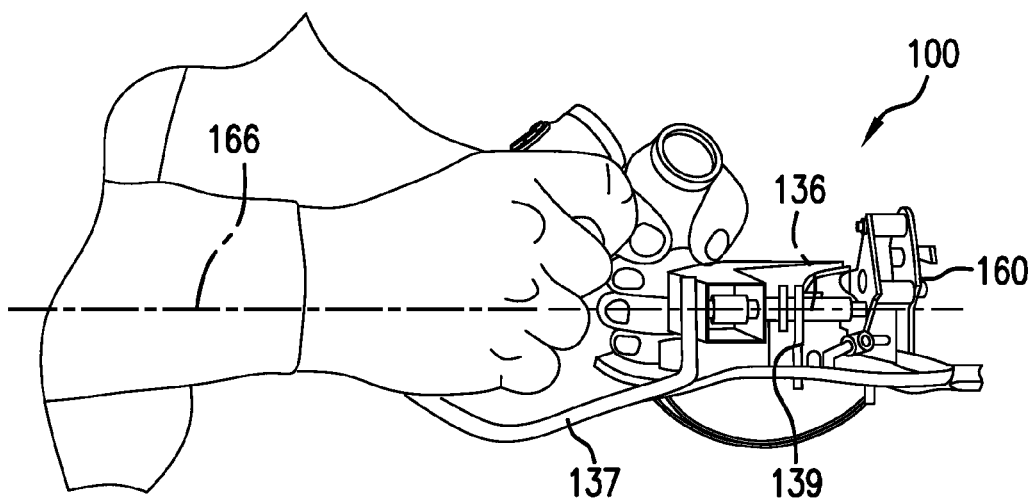
FIG. 6B is a side, elevational view of a dual pivot game controller according to an embodiment of the present invention.

With the axes intersection angle 150 being about 52° and a handle spread 155 (best seen in FIG. 4) of about 9.25 inches, the first and second axes of rotation 126,136 are in-line with a typical user's left and right forearm longitudinal axes, 156, 166, respectively. User forearm longitudinal axes 156,166 are best viewed in FIG. 6A. The user right forearm longitudinal axis is also shown in FIG. 6B. Handle spread is preferably between 4.5 and 18.0 inches, more preferably between 6.25 and 14.5 inches, and most preferably between 7.25 and 12.3 inches. Handle spread 155 is a distance between a first intersection 128, where the first axis of rotation 126 intersects the first handle section 121, and a second intersection 138, where the second axis of rotation 136 intersects the second handle section 131. An axis of rotation is considered in-line with a user's respective forearm longitudinal axis where the axis of rotation and respective forearm axis are within 22° of parallel and are offset by 1.25 inches or less at their respective first or second intersections 128, 138. A user's wrists are typically substantially straight when the user's forearm longitudinal axis is in-line with a rotating assembly axis of rotation.

Figure 3:
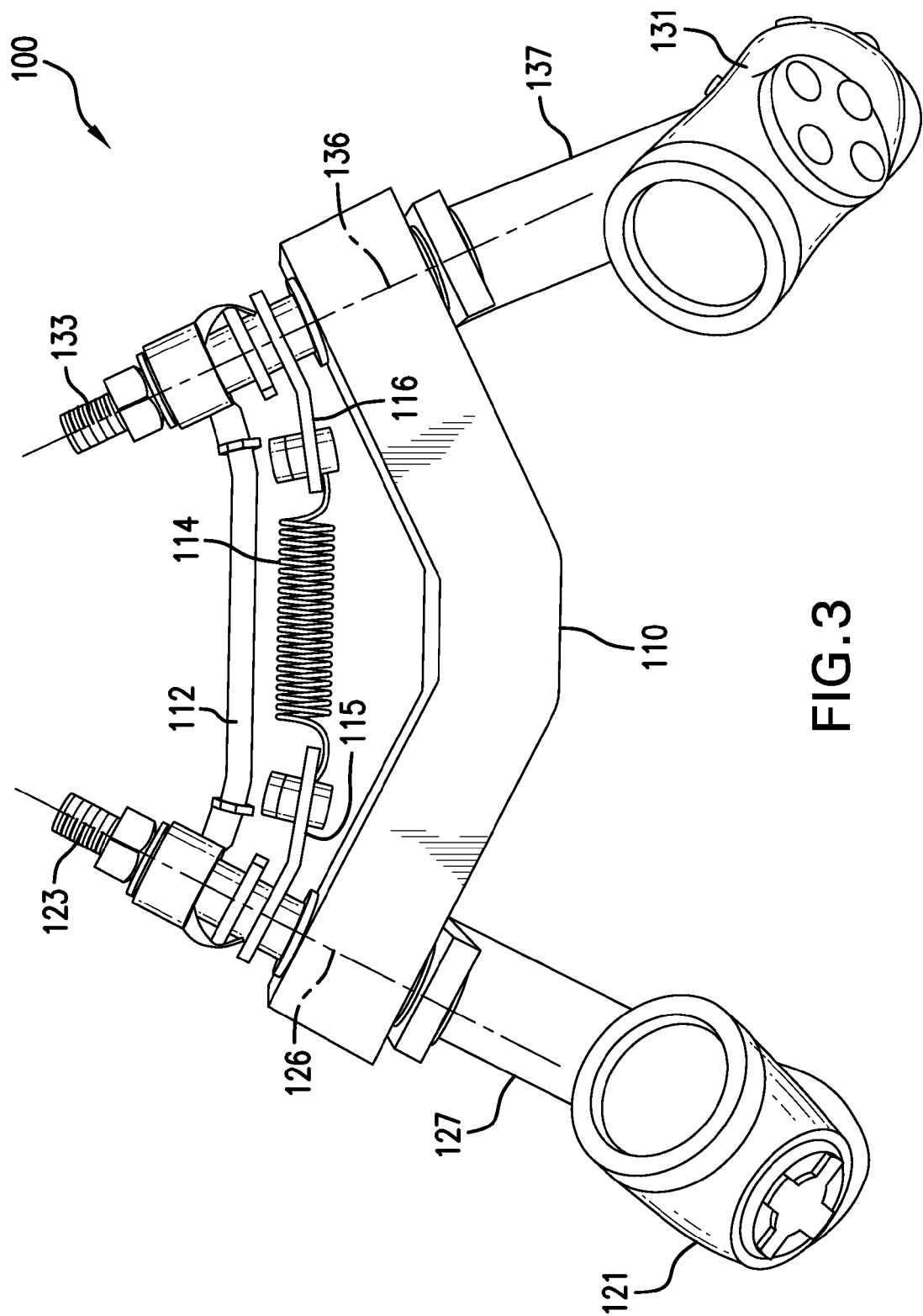
FIG. 3 is a top side, plan view of a dual pivot game controller according to an embodiment of the present invention.
Figure 4:
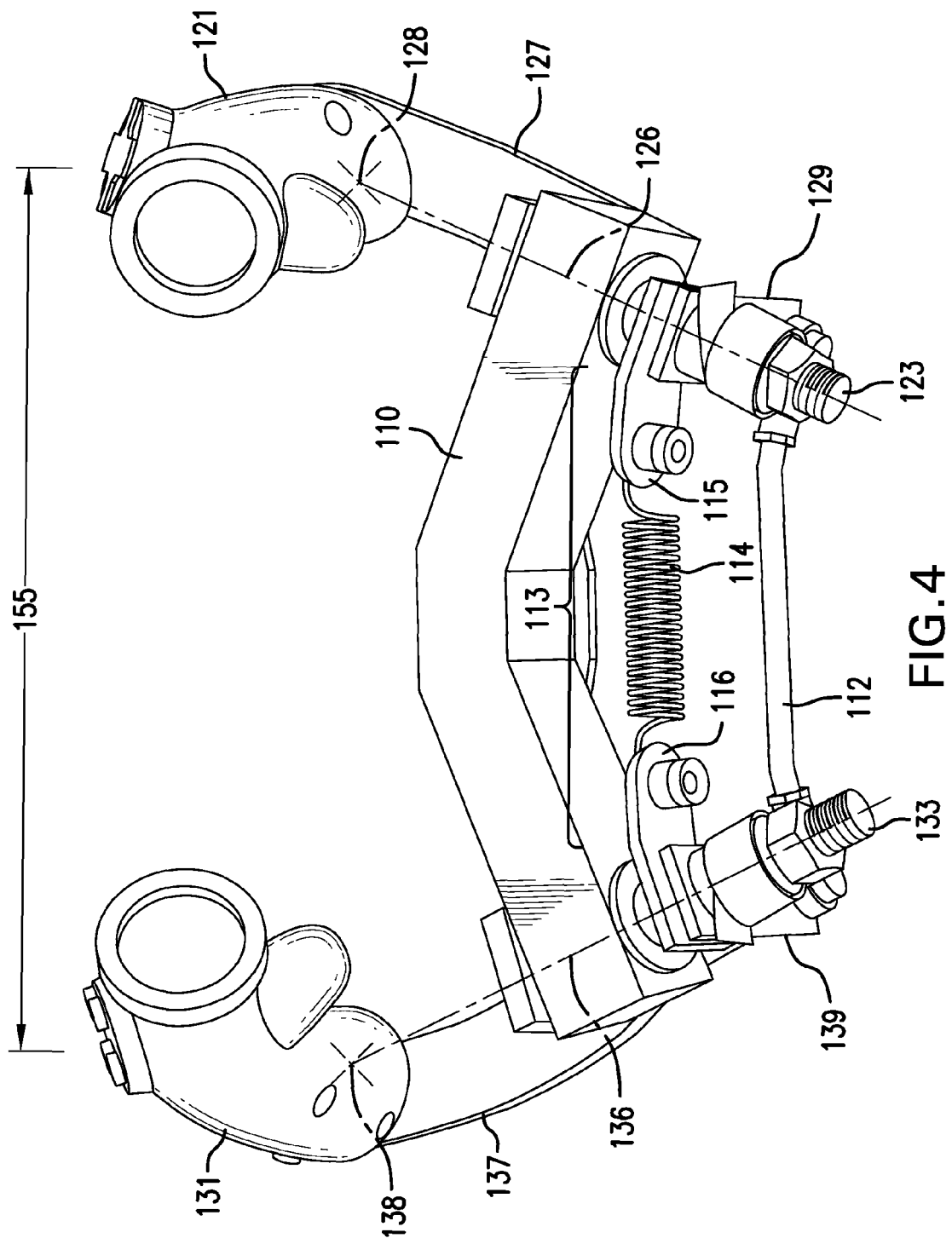
FIG. 4 is a back, top side perspective view of a dual pivot game controller according to an embodiment of the present invention.

As best seen in FIGS. 3 and 4, the first embodiment dual pivot game controller 100 further comprises rotation linking member 112 that rotatably couples the first axle 123 to the second axle 133, such that the first rotating assembly 120 is rotatably linked to the second rotating assembly 130. So rotatably linked, rotation of the first rotating assembly 120 about the first axis of rotation 126 is necessarily accompanied by rotation of the second rotating assembly 130 about the second axis of rotation 136. The rotation linking member 112 is coupled to each of the first and second axles 123,133 by a first and second rotation linking lever arm 129,139, respectively, such that the rotation linking member 112 is offset from the axles. Thus when the first or second rotating member 120,130 rotates about its respective axis of rotation, the rotation linking member 112 is pushed or pulled by a rotation linking lever arm.

When the first embodiment dual pivot game controller is in a neutral orientation, as shown in FIGS. 1-4 and 6A-6B, the first and second rotation linking lever arms 129, 139 are typically oriented perpendicular to a plane in which the first and second axes of rotation 126,136 reside (i.e. either straight up or straight down). The neutral orientation is typically associated with the dual pivot game controller aiming straight ahead for the purposes of controlling a video game. The rotation linking lever arms are obscured by the first and second axles 123,133 in FIGS. 1, 3, and 6A, and by the base 110 in FIGS. 2 and 5A-5B. The second rotation linking lever arm 139 is visible in FIG. 6B and a portion of both the first rotation linking lever arm 129 and the second rotation linking lever arm 139 are visible in FIG. 4.

The first embodiment dual pivot game controller 100 further comprises a biasing mechanism 113 that biases the first and second rotating assemblies 120,130 (and hence the dual pivot game controller) to the neutral orientation. The biasing mechanism of the first embodiment includes a tension spring 114, a first biasing lever arm 115, and a second biasing lever arm 116. Rotating the first and second assemblies 120,130 stretches the tension spring 114, which increases an opposing force that biases the dual pivot game controller toward the neutral orientation. The opposing force of the first embodiment is progressive; further rotation of the rotating assemblies from the neutral orientation causes greater stretching of the tension spring 114, which increases the opposing force (i.e. spring tension) exerted by the tension spring 114. Various embodiments include biasing mechanisms comprising torsion springs or compression springs. Some embodiments include biasing mechanisms that employ magnets to exert opposing force.

Figure 5A:
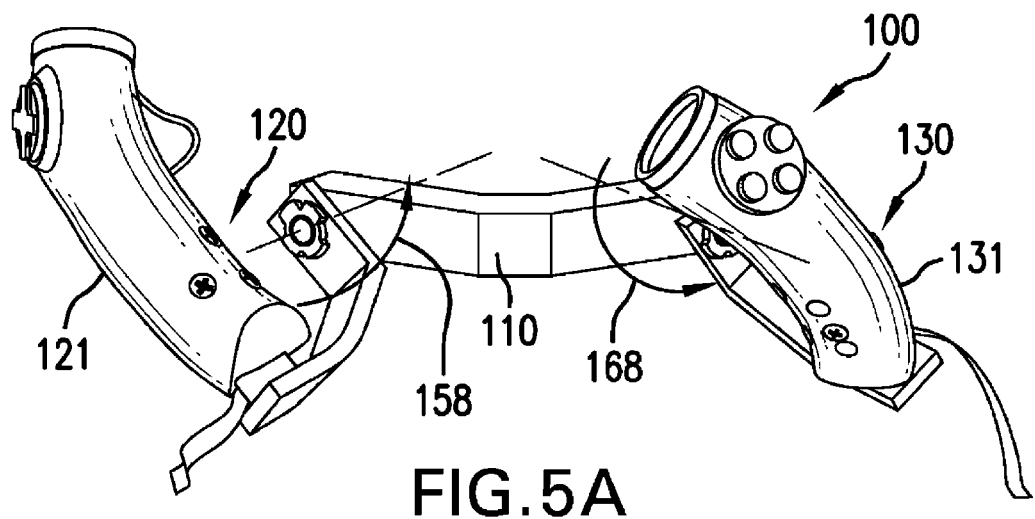
FIG. 5A is a front side, perspective view of a dual pivot game controller according to an embodiment of the present invention.

FIG. 5A shows the dual pivot game controller 100 with the first rotating assembly 120 rotated from the neutral position by a first rotation angle 158 of approximately −45°. As explained above, the first and second rotation assemblies generally rotate in tandem. Accordingly, the second rotating assembly 130 is rotated from the neutral position by a second rotation angle 168 that is substantially identical to the first rotation angle 158 (approximately −45°). Negative rotation angles indicate counterclockwise rotation from the neutral orientation, which generally indicates making a left turn with the dual pivot game controller. Substantially identical rotation angles are plus or minus 11°. Precisely identical rotation angles are plus or minus 4°.

Figure 5B:
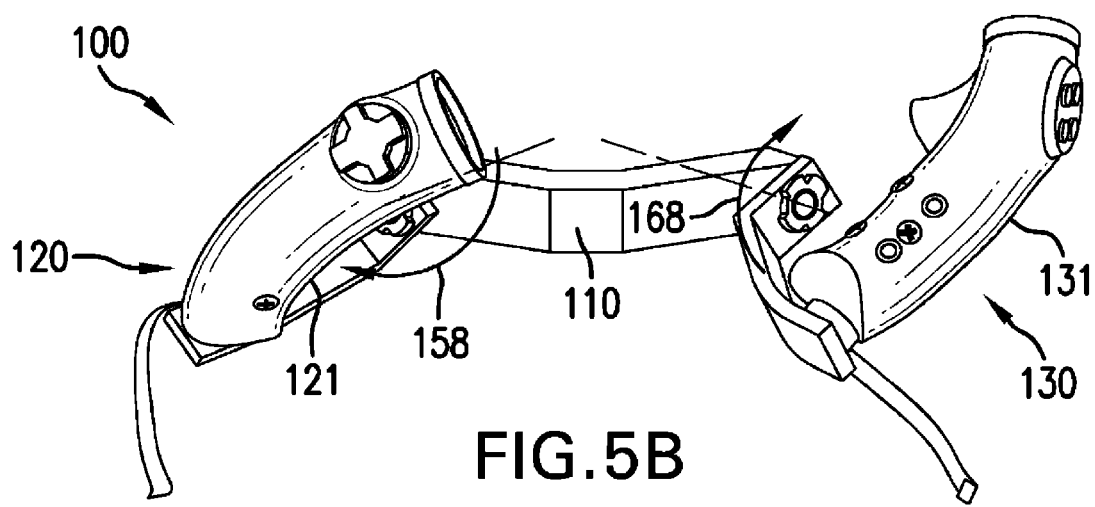
FIG. 5B is a front side, perspective view of a dual pivot game controller according to an embodiment of the present invention.

FIG. 5B shows the dual pivot game controller 100 with the first rotating assembly 120 rotated from the neutral position by a first rotation angle 158 of approximately +45°. Accordingly, the second rotating assembly 130 is rotated from the neutral position by a second rotation angle 168 of approximately +45°. Positive rotation angles indicate clockwise rotation from the neutral orientation, which generally indicates making a right turn with the dual pivot game controller.

As best seen in FIGS. 6A and 6B, the first embodiment dual pivot game controller further comprises a sensor 160 configured to send a signal that reflects a change in orientation of the second rotating assembly 130, and thus to indirectly signal a change in orientation if the first rotating assembly 120, since the rotating assemblies typically move in tandem. The sensor of the first embodiment typically includes an accelerometer or a potentiometer. The accelerometer typically detects any motion by the first rotating assembly 120 or the second rotating assembly 130, whereas the potentiometer is typically configured to signal rotation or position of the first or second rotating assembly relative to the base. The sensor is omitted in FIGS. 1-5. An exemplary sensor includes an accelerometer and wireless sending unit cannibalized from an XBOX 360® Speed Wheel unmounted game controller from Microsoft®.

The first embodiment dual pivot game controller is typically powered by two AA batteries, and the sensor signal is transmitted wirelessly to a gaming device. Variations include a dual pivot game controller having a wired connection with a gaming device. The wired connection can be used to transmit a signal from the sensor to the gaming device, and can also conduct power to the dual pivot game controller.

A Second Embodiment Dual Pivot Game Controller

Figure 7:
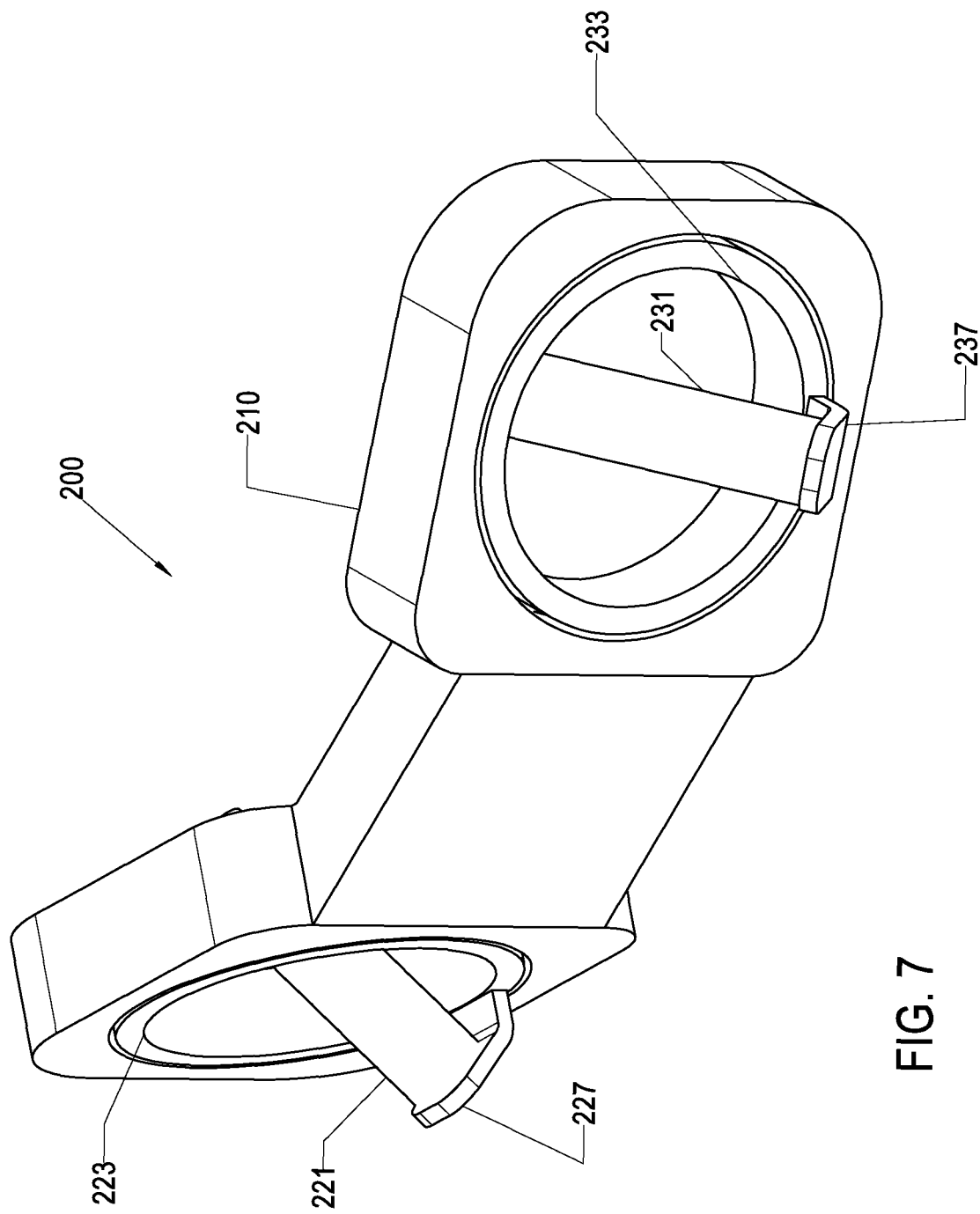
FIG. 7 is a front side, perspective view of a dual pivot game controller according to an embodiment of the present invention.
Figure 8:
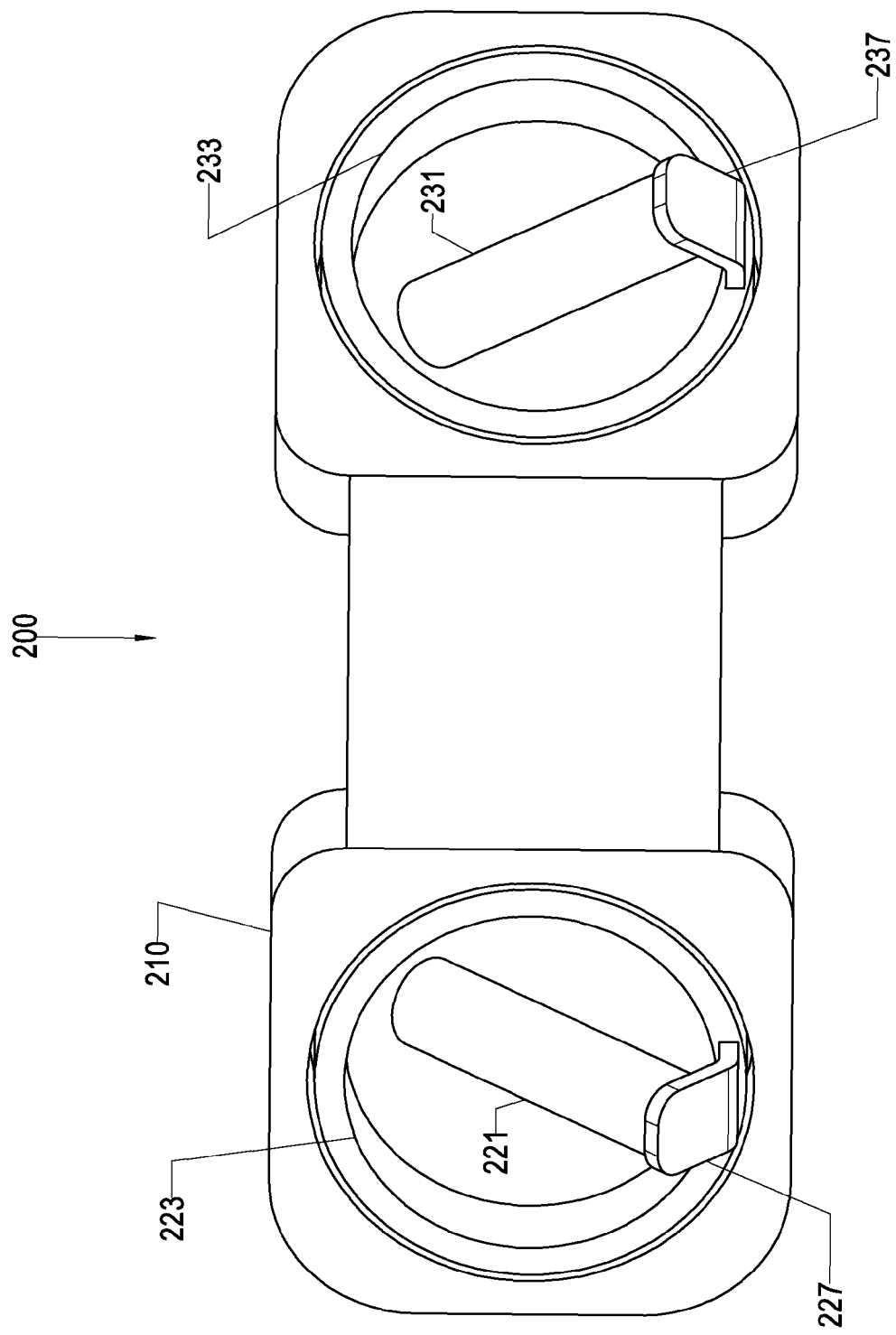
FIG. 8 is a front side, perspective view of a dual pivot game controller according to an embodiment of the present invention.
Figure 9:
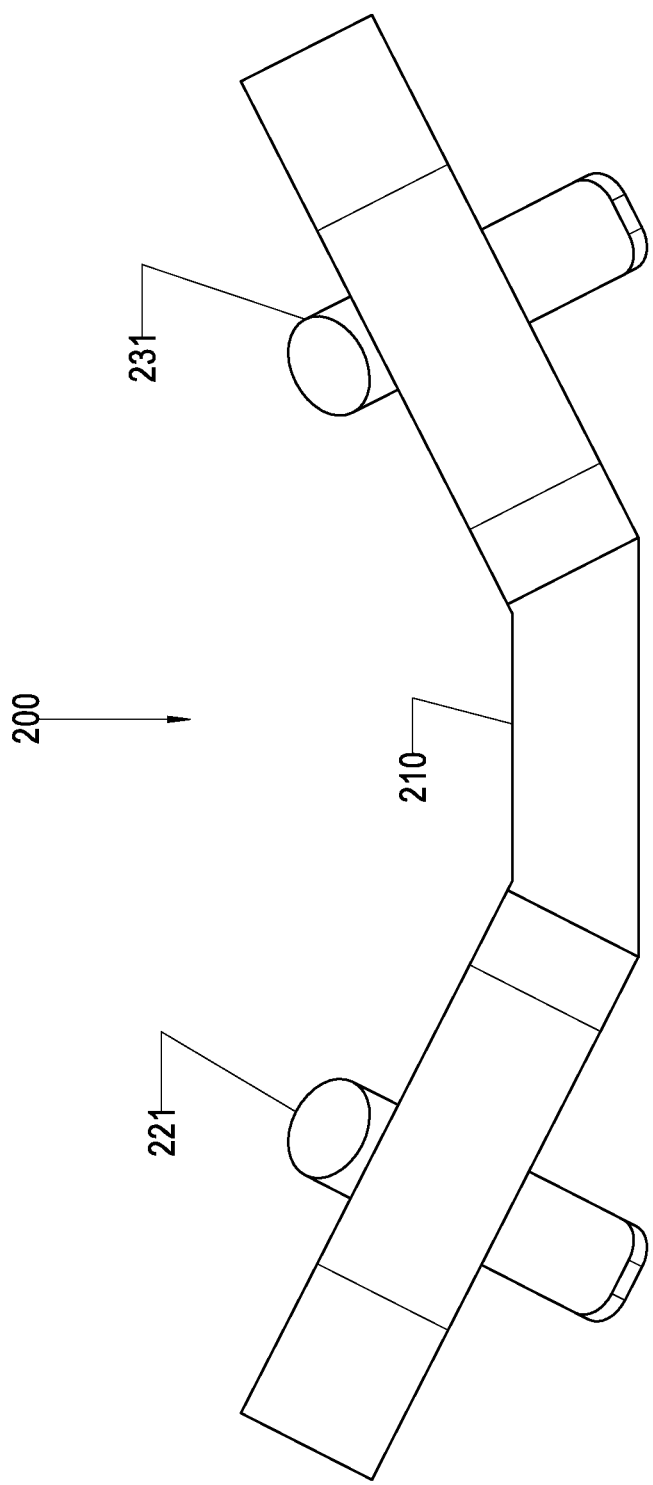
FIG. 9 is a top side, plan view of a dual pivot game controller according to an embodiment of the present invention.

A second embodiment dual pivot game controller 200 is illustrated in FIGS. 7-9. The second embodiment dual pivot game controller 200 comprises a base 210 to which are pivotably coupled a first rotating assembly and a second rotating assembly. The first rotating assembly includes a first handle section 221, a first joining member 227, and a first rotating ring 223. The first handle section 221 is configured to be grasped by a user's left hand in order to facilitate handling and rotation of the first rotating assembly. The first rotating ring 223 is analogous to the first axle 123 of the first embodiment, and is typically encircled and supported by bearings within the base 210 to form a first pivoting connection with the base.

The first joining member 227 sets the first handle section 221 apart from the first rotating ring 223, such that the ring 223 and the base 210 do not interfere with a user's grasp of the first handle section 221.

The second rotating assembly is substantially a mirror image of the first rotating assembly, and thus comprises analogous constituent structures: a second handle section 231 configured to be grasped by the user's right hand in order to facilitate handling and rotation of the second rotating assembly by the user, and a second joining member 237 that couples the second handle section 231 to the second rotating ring 233. The second rotating ring 233 is analogous to the second axle 133 of the first embodiment, and is typically encircled and supported by bearings within the base 210 to form a second pivoting connection with the base. In some embodiments, each of the first and second rotating rings are encircled and supported by a bushing.

The first and second rotating assemblies are rotatably linked such that the assemblies rotate in tandem, i.e. direction and magnitude of rotation of the first rotating assembly about a first axis of rotation causes a substantially identical rotation of the second rotating assembly about the second axis of rotation, and vice versa. Rotatable linking of the first and second rotating assemblies is typically accomplished with gears concealed within the base 210. In an embodiment, each of the first and second rotating rings 223,233 include gear teeth that engage a single gear disposed between the rings, resulting in a three gear system in which each of the rotating rings acts as a gear.

The second embodiment dual pivot game controller 200 further comprises a biasing mechanism configured to bias the first and second rotating assemblies to a neutral position. Oppositional force generated by the biasing mechanism of the second embodiments is progressive. The second embodiment biasing mechanism typically includes an internal spiral spring (not shown) concealed within the base 210. A sensor is also typically concealed within the base.

The second embodiment dual pivot game controller is functionally similar to the first embodiment, with each of the first and second rotating assemblies being configured to rotate in tandem about their respective axes of rotation. The first and second axes of rotation of the second embodiment (not illustrated) typically intersect at an axes intersection angle of about 52°.

The first and second rotating assemblies rotate relative to the base 210, with the first and second rotating rings 223,233 encircled by the base 210, and the first and second handle sections 221,231 partially encircled by the base 210. In typical use with a user's hands grasping the handle sections, the user's hands are also partially encircled by the base.

A difference between the first and second embodiment dual pivot game controllers is that the center of gravity of the first embodiment typically resides several inches in front of a user's hands during use. Conversely, with the second embodiment, a portion of the user's hands and the game controller center of gravity typically reside within a single vertical plane. Operation of the second embodiment typically causes less arm or wrist fatigue for a user, compared to operation of the first embodiment.

Alternative Embodiments and Variations

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

I claim:

1. A dual pivot game controller comprising:
a base;
a first rotating assembly coupled to the base by a first pivoting connection, the first pivoting connection enabling the first rotating assembly to rotate relative to the base, the first rotating assembly includes a first handle section configured to be gripped by a user's hand;
a second rotating assembly coupled to the base by a second pivoting connection, the second pivoting connection enabling the second rotating assembly to rotate relative to the base, the second rotating assembly includes a second handle section configured to be gripped by a user's hand; and
a sensor configured to signal a change in position of the first rotating assembly or the second rotating assembly,
wherein:
a first axis of rotation of the first pivoting connection and a second axis of rotation of the second pivoting connection are substantially non-parallel converging at an axes angle between 22° and 82°, the first axis of rotation intersects the first handle section at a first intersection and the second axis of rotation intersects the second handle section at a second intersection; and
the first rotating assembly is operationally coupled to the second rotating assembly such that rotation of the first rotating assembly around the first axis of rotation and rotation of the second rotating assembly around the second axis of rotation occur in tandem.

2. The dual pivot game controller of claim 1, wherein a handle spread between the first and second intersections is 4.5 inches to 14.5 inches.

3. The dual pivot game controller of claim 1, wherein the first rotating assembly further comprises a first joining member that couples the first handle section to the first pivoting connection, and the second rotating assembly further comprises a second joining member that couples the second handle section to the second pivoting connection.

4. The dual pivot game controller of claim 3, wherein both the first handle section and the second handle section reside at least 0.75 inch from the base.

5. The dual pivot game controller of claim 4, wherein each of the first and second axes of rotation intersect the base.

6. The dual pivot game controller of claim 1, further comprising a biasing mechanism that biases the first and second rotating assemblies to a neutral position.

7. The dual pivot game controller of claim 6, wherein the biasing mechanism exerts a progressive opposing force.

8. The dual pivot game controller of claim 6, wherein the biasing mechanism includes a tension spring.

9. The dual pivot game controller of claim 6, wherein the sensor is configured to signal rotation of the first rotating assembly or the second rotating assembly relative to the base.

10. The dual pivot game controller of claim 9, wherein the sensor is configured to not signal movement of the dual pivot game controller as a whole when the movement does not include rotation of the first rotating assembly or the second rotating assembly relative to the base.

11. The dual pivot game controller of claim 10, wherein the sensor includes a potentiometer.

12. A method of using the dual pivot game controller of claim 1 comprising:
grasping the first handle section;
placing a forearm in-line with the first axis of rotation;
grasping the second handle section; and
placing an other forearm in-line with the second axis of rotation.

13. The method of claim 12, further comprising rotating the first and second rotating assemblies in tandem while maintaining the forearm in-line with the first axis of rotation and the other forearm in-line with the second axis of rotation.

14. A dual pivot game controller comprising:
a base;
a first rotating assembly including a first handle section configured to be gripped by a user's hand, wherein the first rotating assembly is coupled to the base by a first pivoting connection that enables the first rotating assembly to rotate relative to the base;
a second rotating assembly including a second handle section configured to be gripped by a user's hand, wherein the second rotating assembly is coupled to the base by a second pivoting connection that enables the second rotating assembly to rotate relative to the base;
a sensor configured to signal rotation of the first rotating assembly or the second rotating assembly relative to the base; and
a biasing mechanism that biases the first and second rotating assemblies to a neutral position;
wherein:
a first axis of rotation of the first pivoting connection and a second axis of rotation of the second pivoting connection converge at an axes angle between 22° and 82°;
the first rotating assembly is operationally coupled to the second rotating assembly such that rotation of the first rotating assembly around the first axis of rotation and rotation of the second rotating assembly around the second axis of rotation occur in tandem;
the first axis of rotation intersects the first handle section at a first intersection;
the second axis of rotation intersects the second handle section at a second intersection;
a handle spread between the first and second intersections is 4.5 inches to 14.5 inches;
the biasing mechanism exerts a progressive opposing force; and
each of the first and second axes of rotation intersect the base.

15. The dual pivot game controller of claim 14, wherein the sensor is configured to not signal movement of the dual pivot game controller as a whole when the movement does not include rotation of the first rotating assembly or the second rotating assembly relative to the base.

16. The dual pivot game controller of claim 14, wherein the biasing mechanism includes a spring.

17. A method of using a gaming device comprising:
providing a dual pivot game controller including:
a base;
a first rotating assembly including a first handle section configured to be gripped by a user's hand, wherein the first rotating assembly is coupled to the base by a first pivoting connection that enables the first rotating assembly to rotate relative to the base;
a second rotating assembly including a second handle section configured to be gripped by a user's hand, wherein the second rotating assembly is coupled to the base by a second pivoting connection that enables the second rotating assembly to rotate relative to the base; and
a sensor configured to signal rotation of the first rotating assembly or the second rotating assembly relative to the base;
a biasing mechanism that biases the first and second rotating assemblies to a neutral position;
wherein:
a first axis of rotation of the first pivoting connection and a second axis of rotation of the second pivoting connection converge at an axes angle between 22° and 82°;
the first rotating assembly is operationally coupled to the second rotating assembly such that rotation of the first rotating assembly around the first axis of rotation and rotation of the second rotating assembly around the second axis of rotation occur in tandem; and
the biasing mechanism exerts a progressive opposing force;
grasping the first handle section;
placing a forearm in-line with the first axis of rotation;
grasping the second handle section; and
placing an other forearm in-line with the second axis of rotation.

18. The method of claim 17, further comprising rotating the first and second rotating assemblies in tandem while maintaining the forearm in-line with the first axis of rotation and the other forearm in-line with the second axis of rotation.

* * * * *